United States Patent
Yang et al.

(10) Patent No.: US 9,292,279 B2
(45) Date of Patent: Mar. 22, 2016

(54) METHOD AND SYSTEM FOR CREATING AND MANAGING A DYNAMIC ROUTE TOPOGRAPHY FOR SERVICE ORIENTED SOFTWARE ENVIRONMENTS

(71) Applicant: Maluuba Inc., Waterloo (CA)

(72) Inventors: Siwei Yang, Waterloo (CA); Adrian Petrescu, Kitchener (CA); Andrew McNamara, Kitchener (CA)

(73) Assignee: Maluuba Inc., Waterloo (CA)

( * ) Notice: Subject to any disclaimer, the term of this patent is extended or adjusted under 35 U.S.C. 154(b) by 158 days.

(21) Appl. No.: 14/161,000

(22) Filed: Jan. 22, 2014

(65) Prior Publication Data

US 2014/0208295 A1    Jul. 24, 2014

Related U.S. Application Data

(60) Provisional application No. 61/755,178, filed on Jan. 22, 2013.

(51) Int. Cl.
*G06F 9/44* (2006.01)
*G06F 9/445* (2006.01)
(Continued)

(52) U.S. Cl.
CPC .. *G06F 8/70* (2013.01); *G06F 8/36* (2013.01); *G06F 17/3048* (2013.01);
(Continued)

(58) Field of Classification Search
CPC ....... G06F 2212/601; G06F 8/31; G06F 8/34; G06F 8/38; G06F 8/60; G06F 9/54; G06F 1/3203; G06F 1/3209; G06F 1/325; G06F 1/3287; G06F 17/3089; G06F 17/3048; G06F 9/5072; G06F 9/5061; G06F 9/445; G06F 9/5077; G06F 9/44; G06F 8/10; H04L 45/48; H04L 45/44; H04L 45/42; H04L 45/56; H04L 45/60; H04L 45/70; H04L 45/00; H04L 45/16; H04L 45/302; H04L 45/122
See application file for complete search history.

(56) References Cited

U.S. PATENT DOCUMENTS 6,785,704 B1 *  8/2004  McCanne .............. H04L 69/329
                                                          709/201
6,903,755 B1 *  6/2005  Pugaczewski .......... H04L 12/24
                                                          715/735
(Continued)

OTHER PUBLICATIONS

Michael Ciesla et al., URL Extraction on the NetFPGA Reference Router, 2009, [Retrieved on Dec. 18, 2015]. Retrieved from the internet: <URL: http://www2.eet.unsw.edu.au/~vijay/pubs/conf/NetFpga09.pdf> 6 Pages (1-6).*
(Continued)

*Primary Examiner* — Thuy Dao
*Assistant Examiner* — Anibal Rivera
(74) *Attorney, Agent, or Firm* — Perry + Currier Inc.

(57) ABSTRACT

A system, method, and computer-readable medium are provided for managing a route topography in a software environment. The system includes a dashboard user interface for allowing a user to manage the services that are part of a software application. The dashboard allows the user to add and delete services for a software application, to establish a communication identifier of each service, and to clone a first route topography to create a second route topography. A routing service manages the route topography by storing a route identifier and the associated services for the route. When a user modifies an existing route topography or creates a new route topography, the information is managed by the routing service which provides the route information to requesting services upon demand. In one embodiment, each service of the software application includes a route cache with routing information that may be updated periodically by the routing service.

18 Claims, 8 Drawing Sheets

(51) Int. Cl.
*G06F 15/16* (2006.01)
*G06F 17/00* (2006.01)
*G06F 17/30* (2006.01)
*H04L 12/725* (2013.01)
*H04W 4/00* (2009.01)

(52) U.S. Cl.
CPC ......... *G06F 17/3089* (2013.01); *H04L 45/306* (2013.01); *G06F 8/10* (2013.01); *G06F 8/34* (2013.01); *H04W 4/001* (2013.01)

(56) References Cited

U.S. PATENT DOCUMENTS

| | | | | |
|---|---|---|---|---|
| 7,340,520 | B1* | 3/2008 | Jordan | G06Q 30/04 709/201 |
| 7,349,980 | B1* | 3/2008 | Darugar | G06F 17/3089 709/211 |
| 7,853,643 | B1* | 12/2010 | Martinez | H04L 29/06 709/201 |
| 8,074,218 | B2* | 12/2011 | Eilam | G06F 8/10 714/746 |
| 8,141,030 | B2* | 3/2012 | Finlayson | G06Q 10/06 717/102 |
| 8,381,193 | B2* | 2/2013 | Cervantes | H04L 41/069 715/204 |
| 8,638,690 | B2* | 1/2014 | Javaid | H04L 45/302 370/254 |
| 2003/0097464 | A1* | 5/2003 | Martinez | H04L 29/06 709/238 |
| 2003/0193944 | A1* | 10/2003 | Sasagawa | H04L 45/50 370/389 |
| 2005/0114469 | A1* | 5/2005 | Nakamura | G06F 9/44 709/218 |
| 2005/0209983 | A1* | 9/2005 | MacPherson | G06N 5/02 |
| 2006/0149786 | A1* | 7/2006 | Nishiyama | G06F 17/3048 |
| 2006/0265508 | A1* | 11/2006 | Angel | H04L 29/12047 709/230 |
| 2008/0163171 | A1* | 7/2008 | Chess | G06F 9/5077 717/120 |
| 2008/0219237 | A1* | 9/2008 | Thubert | H04L 45/16 370/349 |
| 2009/0125479 | A1* | 5/2009 | Ryman | G06F 17/3089 |
| 2009/0285124 | A1* | 11/2009 | Aguirre | H04L 45/122 370/255 |
| 2010/0014442 | A1* | 1/2010 | Ashwood-Smith | H04L 45/00 370/255 |
| 2010/0154038 | A1* | 6/2010 | Natarajan | H04L 63/08 726/5 |
| 2010/0332761 | A1* | 12/2010 | Li | G06F 12/0893 711/129 |
| 2011/0302292 | A1* | 12/2011 | Acharya | H04L 41/12 709/224 |
| 2012/0117531 | A1* | 5/2012 | Rosenbaum | G06F 9/445 717/100 |
| 2012/0254804 | A1* | 10/2012 | Sheha | G06Q 30/02 715/834 |
| 2012/0266129 | A1* | 10/2012 | Massoudi | G06F 8/34 717/105 |
| 2013/0007710 | A1* | 1/2013 | Vedula | G06F 9/5061 717/124 |
| 2013/0028140 | A1* | 1/2013 | Hui | H04W 40/248 370/255 |
| 2013/0086551 | A1* | 4/2013 | Archer | G06F 8/34 717/113 |
| 2013/0132850 | A1* | 5/2013 | Subramanian | H04L 41/12 715/735 |
| 2013/0179876 | A1* | 7/2013 | Aliminati | H04L 41/0893 717/177 |
| 2013/0262678 | A1* | 10/2013 | Tung | G06F 9/5072 709/226 |
| 2013/0283174 | A1* | 10/2013 | Faridian | H04J 3/0641 715/736 |
| 2014/0040502 | A1* | 2/2014 | McClenahan | H04L 67/10 709/238 |
| 2014/0129733 | A1* | 5/2014 | Klais | H04L 67/327 709/239 |

OTHER PUBLICATIONS

Rafael De T. Valle et al., Mesh Topology Viewer (MTV): an SVG-Based Interactive Mesh Network Topology Visualization Tool, 2008 IEEE, [Retrieved on Dec. 18, 2015]. Retrieved from the internet: <URL: http://ieeexplore.ieee.org/stamp/stamp.jsp?tp=&arnumber=4625602> 6 Pages (292-297).*

* cited by examiner

| Request Routing  prodv1 | 206 | New route name... | Clone |

Delegate Service 202
HOST: https://delegate.maluuba.com

Sync Service
HOST: https://sync.maluuba.com

NLP Service (e.g. 204c)
HOST: http://fi-nlp-2-1-1-1073987224.us-east-1.elb.amazonaws.com:80

Context Service
HOST: http://fi-context-5-0-0-0905081107-269430003.us-east-1.elb.amazonaws.com

Timeline Service
HOST: http://fi-timeline-9-7-6-1932168491.us-east-1.elb.amazonaws.com

Templatation Service
HOST: http://fi-templatation-2-11-1249532183.us-east-1.elb.amazonaws.com

Details for requestid: prodv1    820
Platform Service:
  ENTERTAIN SERVICE ▲▼
Host:
  http://fi-entertain-25-4-1-183974

Delegate will use this    810
URL when making a
REST call to the
selected Platform
service.
  [Save changes]
  [Cancel]
          830

FIG. 8

Platform Services
APITRACKING SERVICE: http://fi-aptracking-2-0-1-1658571548.us-east-1.elb.amazonaws.com
MUSIC SERVICE: http://fi-music-3-0-1-0905031217-60620225.us-east-1.elb.amazonaws.com
EXPEDIA SERVICE: http://null
KNOWLEDGE SERVICE: http://fi-knowledge-3-1-1-998307314.us-east-1.elb.amazonaws.com
TRANSIT SERVICE: http://fi-transit-16-1-6-842463042.us-east-1.elb.amazonaws.com
WEBSEARCH SERVICE: http://fi-websearch-7-0-0-1441783848.us-east-1.elb.amazonaws.com
SOCIALNETWORK SERVICE: http://fi-socialnetwork-6-7-1435125912.us-east-1.elb.amazonaws.com
ENTERTAIN SERVICE: http://fi-entertain-25-4-1-1839745436.us-east-1.elb.amazonaws.com
CONTACTS SERVICE: http://fi-contact-6-2-0-0905040059-223091591.us-east-1.elb.amazonaws.com
WEATHER SERVICE: http://fi-weather-11-6-3-212812716.us-east-1.elb.amazonaws.com
CALENDAR SERVICE: http://fi-calendar-4-1-1-0905040657-1514169526.us-east-1.elb.amazonaws.com
REMINDER SERVICE: http://fi-reminders-5-0-0-0905040059-379205928.us-east-1.elb.amazonaws.com
SPHINX SERVICE: http://fi-sphinx-5-2-11029364765.us-east-1.elb.amazonaws.com
ECHONEST SERVICE: http://null

METHOD AND SYSTEM FOR CREATING AND MANAGING A DYNAMIC ROUTE TOPOGRAPHY FOR SERVICE ORIENTED SOFTWARE ENVIRONMENTS

CROSS REFERENCE TO RELATED APPLICATIONS

This application is a Non Provisional application which claims the benefit of U.S. Provisional Patent Application No. 61/755,178 filed Jan. 22, 2013, all of which are herein incorporated by reference.

FIELD OF THE INVENTION

The present subject matter relates to software development, and more particularly, to creating and organizing route topographies for software services.

BACKGROUND

Software is often deployed in a service oriented architecture (SOA) environment. SOA is a set of principles and methodologies for designing and developing software in the form of interoperable services. These services are well-defined business functionalities that are built as software components (discrete pieces of code and/or data structures) that can be reused for different purposes.

Typically, services in software development may be designated as either production or development. Production services are services that have been tested extensively and are deployed in a production environment, meaning that the production services are being used by users of the software application. Development services are services that are currently under development by programmers, and although they may be in the process of being tested, they are not yet deployed to the production environment. One challenge often encountered in an SOA environment is fully testing a development service with other production services. A development service that is incorrectly deemed to be production-ready may not perform as expected in a production environment, leading to incorrect data dissatisfied customers, and other consequences.

Furthermore, it can be cumbersome to make changes to an application or an SOA implementation to direct the application and/or SOA components to use a particular development server for example. For example, changes to server routing information may rely on DNS services. DNS services may be slow to recognize and propagate changes. Changing the details within the software application may require that the new server information (e.g. URLs) be provided to the computing device of each user, which can be a cumbersome process, or, in some manners, that the server address to which a server name resolves be changed with the DNS service, which can also be cumbersome.

BRIEF DESCRIPTION OF DRAWINGS

Exemplary embodiments of the subject matter will now be described in conjunction with the following drawings, by way of example only, in which:

FIG. 8 illustrates an exemplary route dashboard user interface screen for managing route topography information.

For convenience, like reference numerals refer to like parts and components in the various drawings.

SUMMARY

Figure 1:
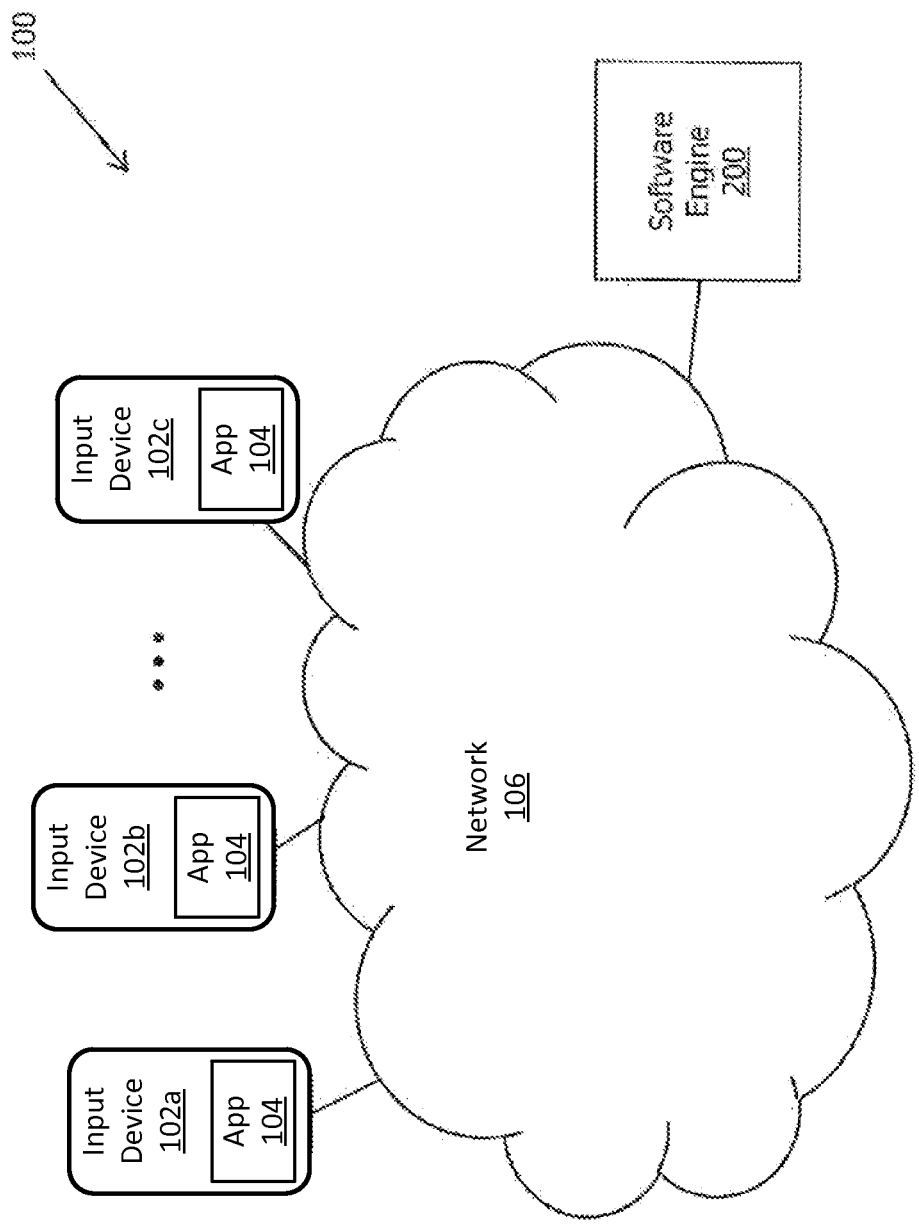
FIG. 1 is a block diagram showing infrastructure for providing services to users of computing devices.

Disclosed is a system, method and computer-readable medium for dynamically creating and modifying a route topography for a software application. In one embodiment, a method is provided comprising identifying a plurality of services as relevant to the software application being deployed. Each service is assigned a communication identifier (such as a web address) to facilitate communication between services. A route may be created with a listing of the relevant services and their associated communication identifiers. The route is given a route identifier so that one route may be distinguished from another route. The services are then deployed in an environment (e.g. a cloud-based infrastructure) so that users may use the software application.

In one aspect, developers can clone a first route to generate a second route. The second route contains the same listing of services with their respective communication identifiers; however, the second route is given a different identifier than the first route. In some situations, a developer may wish to modify the communication identifier for at least one service in the second route so that the second route and the first route have different topographies. For example, a developer may wish to test a development service against a production environment in order to perform integration testing. In such a case, the developer may clone an appropriate production route (for example, a route called 'PROD') to create an identical second route. The developer may give the cloned route a name, for example, 'DEV', which can have the identical listing of services and associated communication identifiers as the 'PROD' route. The developer may wish to change the communication identifier of the service being tested so that the DEV route associates a web address with the development service.

In one aspect, various techniques are provided for deploying (or testing) a software service. For example, a developer that wishes to deploy a service (or test the service) can select a first route that has already been created and clone the route to create a second route. For the service that is to be tested, a developer can select the service from the cloned route and modify the associated identifier to identify the development service location. In another aspect, a developer wishing to deploy a service (or test the service) can assign the new version of the service to the location of the old version of the service on the existing route being used.

There is provided a computer-implemented method of managing route topography information for a software application. The method comprises storing at least one route topography comprising respective identifiers for each of one or more services for serving the software application and associated communication identifiers providing a location to communicate for the one or more services; receiving a request for the route topography; and providing the route topography in response to the request.

The method may comprise storing each route topography in association with a respective route identifier for identifying the route topography. Further, the method may comprise receiving the request from a particular service serving the software application, the particular service providing the route identifier as part of the request.

The one or more services for serving the software application may provide natural language processing functionality for the software application.

The method may comprise retrieving the route topography from a data store storing the route topography using the route identifier.

The method may comprise receiving the route topography from a route dashboard user interface configured to define and store route topography information, the route dashboard user interface configured to receive input identifying particular software services and associated communication identifiers to define a particular route topography. The route dashboard user interface may be configured with a cloning function to define a second route topography from a first route topography.

The associated communication identifiers of the method may be respective Uniform Resource Locators (URLs).

The method may be performed by a server providing a routing service on behalf of the one or more services.

There is provided a computer-implemented method of providing a service to a software application. The method comprises receiving a request for one or more services from the software application; requesting route topography information from a routing service, the route topography information comprising respective communication identifiers associated with the one or more respective services to provide a location to communicate for the one or more services; and communicating with one or more of the respective services using the route topography information to respond to the software application.

The request for one or more services from the software application may comprise a route identifier to identify the route topography information, and the method may comprise using the route identifier when requesting the route topography information.

The method may comprise receiving respective requests for one or more services from first and second instances of a same software application, the respective requests having different respective route identifiers associated with different route topography information to thereby direct communicating with different respective services for responding to the first and second instances of the same software application.

The method may comprise caching the route topography information in a cache. The method may further comprise looking to the cache for the route topography and requesting route topography information from the routing service only on a cache miss.

There is provided a computer system comprising at least one processor and a memory storing instructions and data, which when executed by the processor, cause the computer system to perform at least one of the methods described above.

There is provided a non-transitory computer-readable medium for managing route topography information for a software application, the non-transitory computer-readable medium comprising instructions that, when executed, cause a computer to perform at least one of the methods described above.

DETAILED DESCRIPTION

Throughout this specification and claims, the term "service" includes software components that can be reused for different purposes in a service-oriented architecture environment. A service making a request is referred to as a requesting service and a service receiving a request for information and/or functionality will be referred to as a client service (or requested service).

A route topography management system may provide route topography information to requesting services. A route topography includes a route identifier (such as a route name), a listing of one or more software services associated with a given software application, and one or more communication addresses (e.g. a uniform resource locator) so that a requesting service can communicate with a software service.

A routing service may be an access point for communication between a requesting service and a requested service. In one embodiment, for a requesting service to call one or more requested services, the requesting service first communicates with a routing service. The routing service is configured to provide route information to the requesting service including the communication addresses of the one or more services to be called. Once the requesting service has a communication address for each requested service, the requesting service may call the requested service.

A route cache may be maintained at each requested service that contains route information. The requesting service may access the route cache to retrieve route information before communication is made with a requested service. The route cache may be updated by the routing service (e.g. by push and/or pull technology) at periodic intervals or upon the happening of certain events (for example, a user making a request).

A dashboard screen may be provided by a user interface module for allowing a user to interact with and create a route topography. For example, the dashboard screen may include a clone element (e.g. a clickable "clone" button) whereby clicking on the clone element creates a second route identical to the first route being displayed on the dashboard screen. Such functionality can allow a user to quickly create a second route, and then modify the second route as desired. In one embodiment, a user (such as a programmer) may desire to test a development service in a production environment. The user may, via the dashboard screen, clone a production route to create a second route and then give the second route a new name. The developer may then change the communication address of the service to be tested (for example, to the developer's computer or another development server) and begin testing the application.

The subject matter may be embodied as devices, systems, methods, and/or computer program products. Accordingly, some or all of the subject matter may be embodied in hardware and/or in software (including firmware, resident software, microcode, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RE, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment of a networked environment 100 showing a software engine 200 providing functionality to users of a client application 104 on input devices 102a-n. Client application 104 may be a web browser, mobile app, desktop application, and so forth that allows users to interact with software engine 200. Software engine 200 may be a cloud-based software application that communicates with the client application 104 over a network 106 (such as the Internet). Software engine 200 may be designed according to service oriented architecture principles such that the software engine 200 includes a variety of component software services (shown in FIG. 2) that communicate with and provide functionality to each other.

Figure 3:
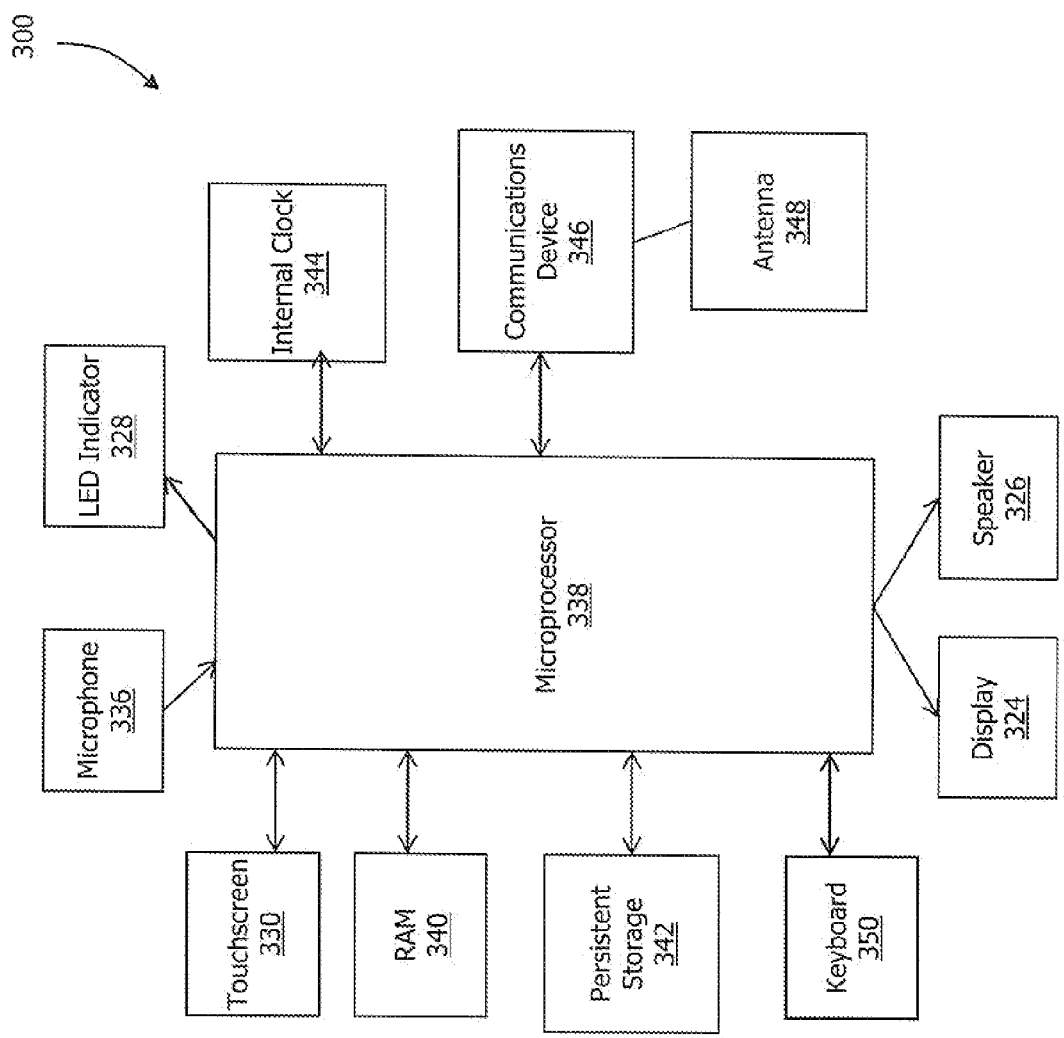
FIG. 3 is a block diagram illustrating one embodiment of the components of a computing device for implementing various aspects of the subject matter disclosed herein.

Referring to FIG. 3, input device 102 may be any computing device 300 such as a smartphone, tablet, personal computer, set-top box, and the like. Software engine 200 may be distributed and scalable over multiple computing devices 300 according to server loading within a cloud-based service infrastructure.

Figure 2:
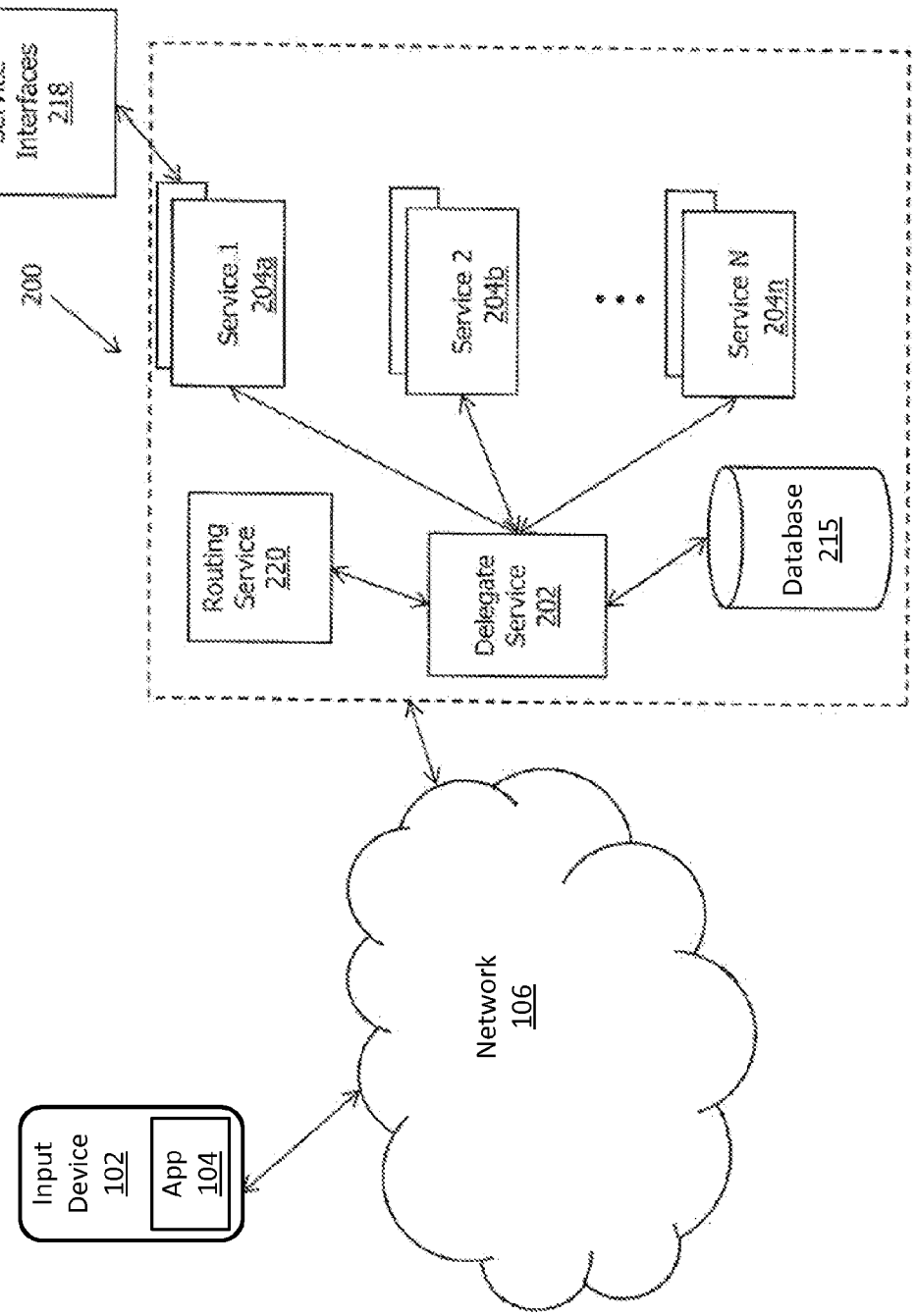
FIG. 2 is block diagram illustrating one embodiment of the components of the software engine of FIG. 1.

Referring to FIG. 2, a software engine 200 according to various embodiments is shown with some constituent components. Software engine 200 may include a delegate service 202 for handling incoming requests from input device 102. A delegate service 202 may include one or more load balancers for managing server loading according to predetermined rules and metrics such that delegate services 202 may be created and destroyed dynamically in a cloud-computing environment depending on demand or other factors. A delegate service 202 may receive communication and functionality requests from application 104 on client input devices 102, and may route the requests to the appropriate services 204a-n.

Typically, each service 204a-n will provide well-defined business functionality and may communicate with other services (e.g. 204a-n and/or delegate service 202) using predetermined interfaces. As an example, in a natural language processing (NLP) software engine 200 configured to provide information according to user intent, one or more of services 204a-n may provide various functionality including automatic speech recognition, natural language processing to derive user intent and extract pertinent entities, interfacing with application programming interlaces (APIs) of one or more external service interfaces 218, geocoding, contact management and so forth. Each service 204a-n may communicate with each other directly or via a delegate service 202. In various embodiments, requests from client application 104 are made directly to the appropriate service 204a-n and a delegate service 202 is not included. Each service 204a-n may include one or more load balancers for creating and destroying services horizontally depending on demand or other factors.

It will be appreciated that at any given moment, the delegate service 202 and services 204a-n may be a requesting service and/or a client service. Furthermore, although a specific service such as service 204a may be referred to in the singular, it is to be appreciated that multiple services 204 may be active as requesting services and/or client services at any given time.

A routing service 220 may be provided for managing the route topography that describes the communication parameters between the various services. The routing service 220 can include a route dashboard 206 interface (available through a software application such as a web browser) in which a user may add or subtract services, clone an existing route to make a copy, change the name (i.e. identifier) of a route, change communication addresses of one or more services, and so forth (see FIG. 4).

A database 215 (e.g. a DynamoDB™) may be provided for storing route objects. The database 215 can communicate with the delegate service 202 and/or with the services 204 (not shown).

In various embodiments, software engine 200 may interface with one or more external software modules via external service interfaces 218 (e.g. APIs) which may provide additional functionality or content.

FIG. 3 illustrates a block diagram of certain components of a computing device 300, which is representative of input device 102 as well as computing devices 300 implementing one or more components of the software engine 200. In various exemplary embodiments, computing devices 300 may provide client or server functionality including personal computers, server computers, smartphone, tablet computers, etc. In various exemplary embodiments, computing device 300 is based on the computing environment and functionality of a hand-held wireless communication device. It will be understood, however, that the computing device 300 is not limited to a hand-held wireless communication devices. Other electronic devices are possible, such as laptop computers, personal computers, set-top boxes, electronic voice assistants in vehicles, and the like.

Computing device 300 is based on a computer that includes one or more computer microprocessors 338 (also referred to herein as a processor) connected to a random access memory unit (RAM) 340 and a persistent storage device 342 that is responsible for various non-volatile storage functions of the computing device 300. Operating system software executable by the microprocessor 338 is stored in the persistent storage device 342, which in various embodiments is flash memory. It will be appreciated, however, that the operating system software can be stored in other types of memory such as read-only memory (ROM). The microprocessor 338 can receive input from various devices including a touchscreen 330, keyboard 350 and mouse (not shown), communications device 346, and microphone 336, and can output to various output devices including the display 324, the speaker 326 and the LED indicator(s) 328. The processor 338 can also be connected to an internal clock 344.

In various embodiments, the computing device 300 is a two-way RF communication device having voice and data communication capabilities. Computing device 300 also includes Internet communication capabilities via one or more networks 106 such as cellular networks, satellite networks, Wi-Fi networks and so forth. Two-way RF communication can be facilitated by a communications device 346 that is used to connect to and operate with a data-only network or a complex voice and data network (for example GSM/GPRS, CDMA, EDGE, UMTS or CDMA2000 network, fourth generation technologies, etc.), via the antenna 348.

Although not shown, computing device 300 may be powered by a battery (e.g. where input device 102 is a smartphone) or alternating current.

The persistent storage device 342 may also store a plurality of applications executable by the microprocessor 338 that enable the computing device 399 to perform certain operations including the communication operations referred to above (e.g. communication between components of the intelligent services engine 200 or communication between computing devices 300). Other application software may be provided including, for example, an email application, a Web browser application, an address book application, a calendar application, a profiles application, among others. The computing device 300 may host one or more virtual services (as is known in a software oriented architecture) that provide functionality upon the request of a user using a client application on another device.

Though shown as a single device, computing device 300 may comprise multiple separate components. For example, input/output devices may be coupled wirelessly to computing device 300.

Figure 4:
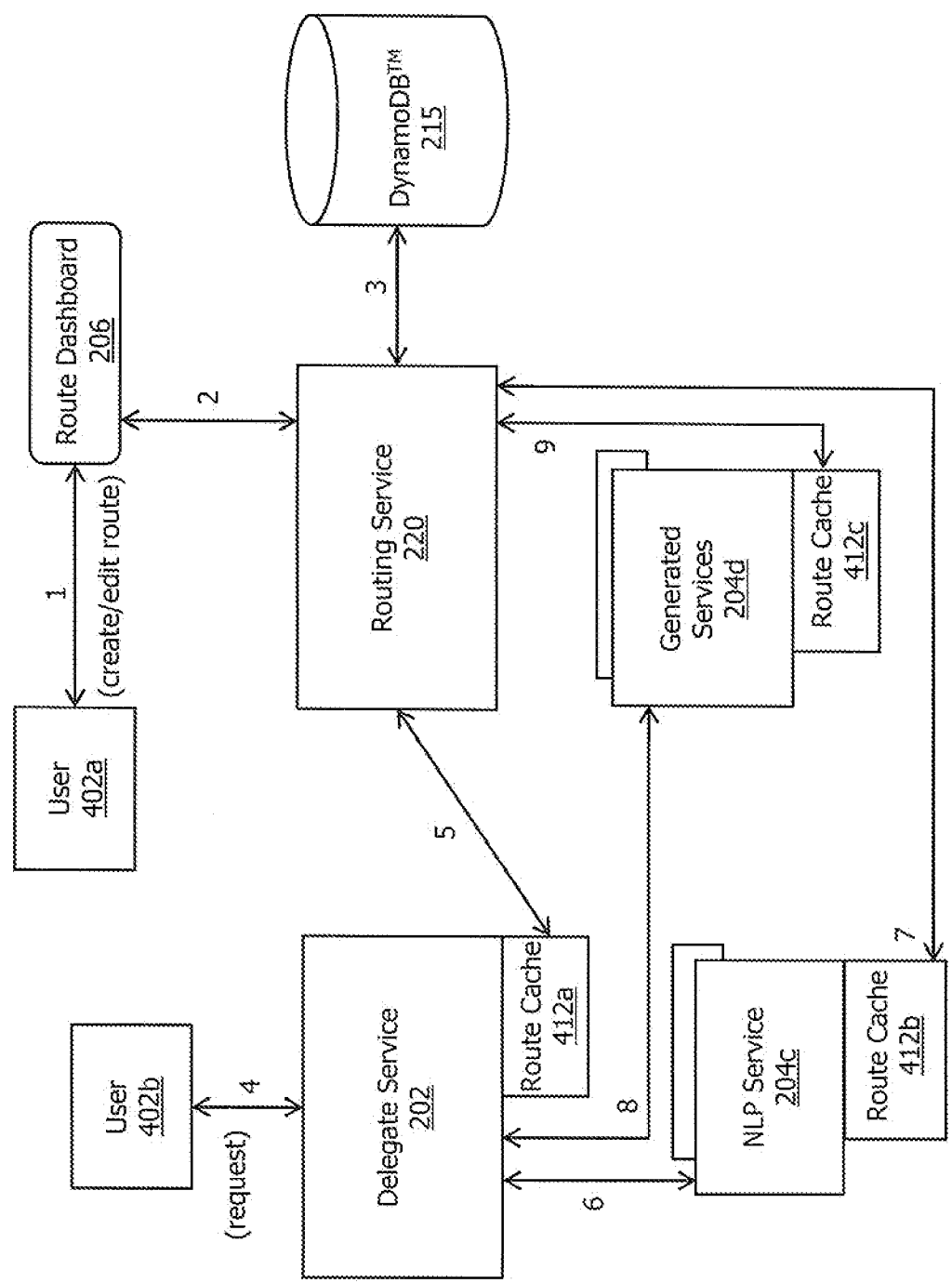
FIG. 4 is a flowchart showing one embodiment of the interactions between the components of the infrastructure of FIG. 1.

Reference is next made to FIG. 4 to describe the architecture and functionality of the routing service 220 in accordance with various embodiments described herein. A user 402a (such as a software developer) may create or access a route topography by visiting a route dashboard 206 presented and managed by a Ux manager component. In various embodiments, the route dashboard 206 may be presented through an internee browser directed to a URL hosting the route dashboard 206 webpage(s). The routing service 220 receives route topography information entered into the route dashboard 206 and updates each route cache 412 at the delegate service 202, NLP service 204c and any other generated services 204d. An example route dashboard 206 user interface screen is shown in FIG. 8.

In various embodiments, the flow of information may be as follows. At step 1, a developer 402a may create and/or edit a particular route topography using a route dashboard 206. Example parameters may comprise:

```
{
  "routeID": "DEV",
  "nlpPath": "http://...",
  "templatationPath": "http://...",
  ...
}
```

The information provided by the developer 402a at the route dashboard 206 is sent to the routing service 220 at step 2, and may be stored in a database 215 as a route object (e.g. DynamoDB™ object) at step 3. A user 402b may make a request using a client application 104 at step 4, the request being directed to the delegate service 202 which may serve as a gatekeeper for all user 402b requests. An example request may be:

UserRequest
(Route "dev")

The route topography information may be cached in route cache 412a by the delegate service 202 (by calling the routing service 220 at step 5). The request made by user 402b may be provided to for example NLP service 204c (at step 6) and/or other generated services 204d (at step 8). For example, at step 6, the provided information may be:

NLPRequest
(Route "dev")

At step 8, the provided information may be:

PlatformRequest
(Route "dev")

The NLP service 204c and/or generated services 204d may also cache the route topography information (at steps 7 and 9, respectively). The route topography information can be cached by each service (e.g. delegate service 202. NLP service 204c, and generated services 204d) querying (at step 5, step 7 and step 9, respectively) the routing service 220 periodically and/or upon the happening of certain events (for example, a user making a request) and updating its respective route cache 412 with any new route topography information. For example, a call may be made if the route cache 412 does not contain the requested information:

```
If cache miss {
      "routeID": "DEV",
      "nlpPath": "http://...",
      "templatationPath": "http://...",
      ...
}
```

In some embodiments, each service (e.g. NLP service 204c) can call the routing service 220 whenever the service requires communication information of another service (e.g. generated services 204d) of the software engine 200.

Figure 5:
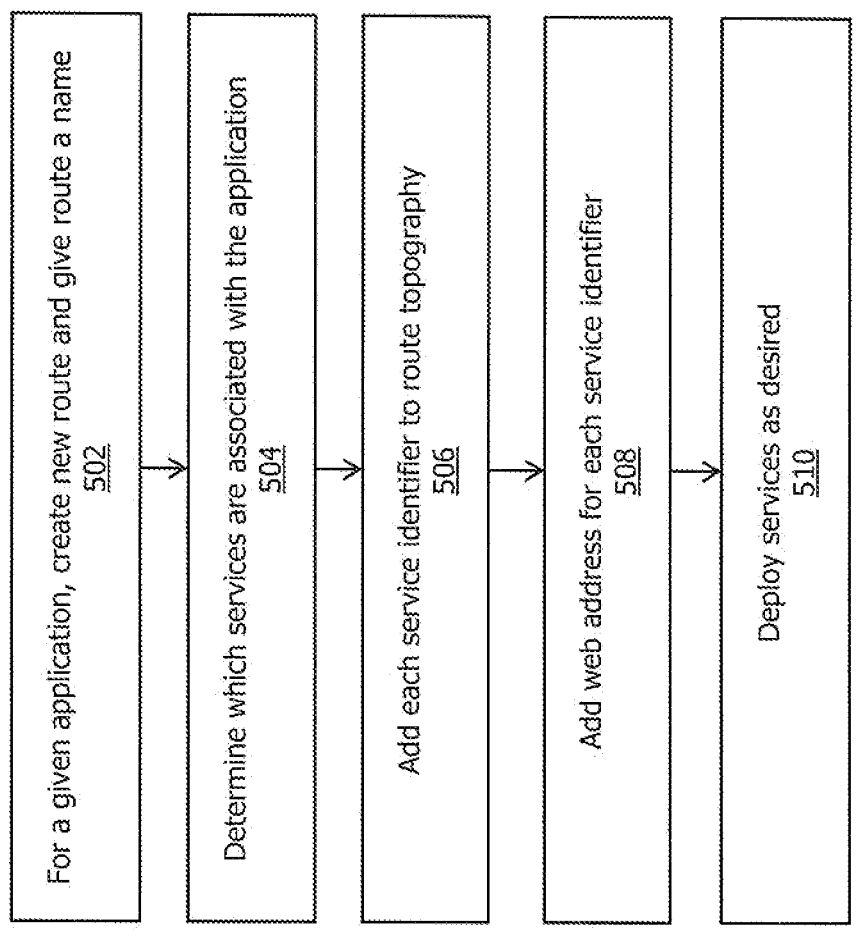
FIG. 5 a flowchart showing an exemplary method for creating a route for an application.

Reference is next made to FIG. 5 to describe example operations that may be performed for creating a route topography for a software application. At step 502, a user 402a (such as a software developer or deployment manager) creates a route by interacting with an element of the route dashboard 206 such as a "create route" button. The user 402a then gives the route a name (route identifier). At step 504, the user 402a determines which software services (e.g. NLP service 204c) associated with the application will need to intercommunicate. At step 506, the user 402a adds each selected software service to the route topography via a route dashboard 206 user interface element such as an "add service" button. At step 508, the user 402a assigns a communication address for each service added at step 506. In some embodiments, the communication address may be a URL. Finally, at step 510, the user may deploy each of the services as desired at their respective locations (e.g. URL locations). In some embodiments, the services for a route topography are deployed in a cloud-based infrastructure.

Figure 6:
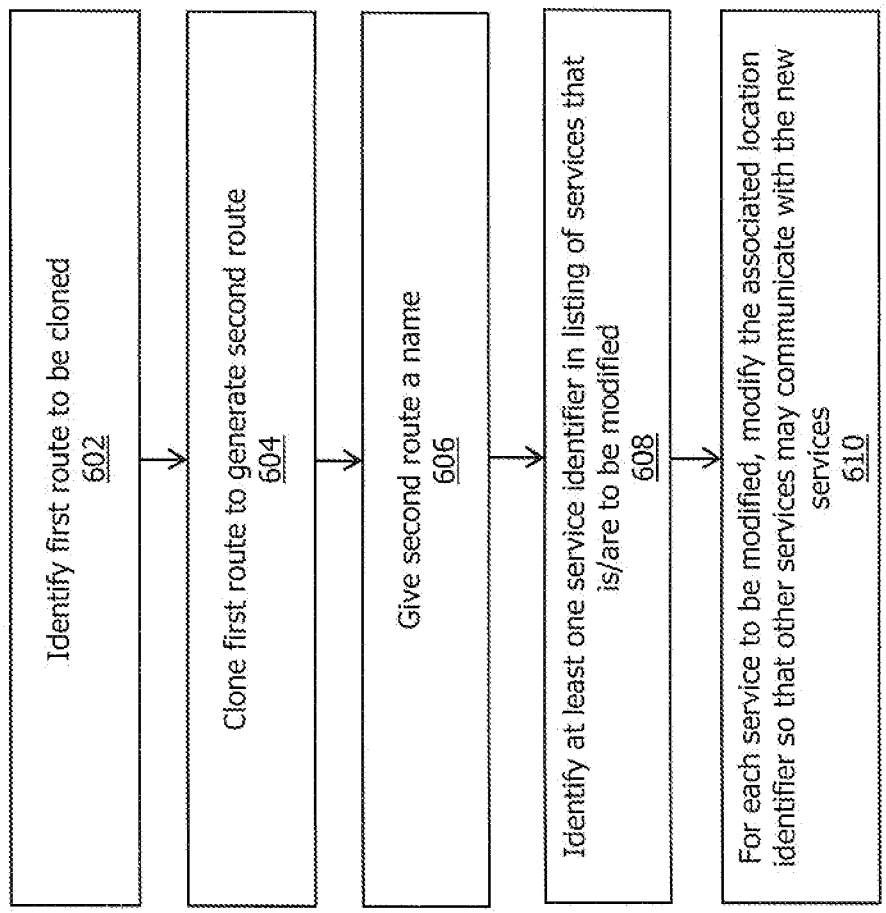
FIG. 6 is a flowchart showing a further embodiment of a method for creating a route for an application involving cloning a first route.

Referring to FIG. 6, example operations are shown for cloning a route topography. A user may wish to clone a route for several reasons. For example, a developer may wish to test a development service in a production environment. To accomplish this, the developer may only need to clone the production route topography to create a development route topography, and then change the communication address of the service to be tested. A developer may also wish to clone an existing route when the route topography to be created is very similar to an existing route. To clone a route, the user 402a identifies the first route topography to be cloned at step 602. At step 604, the user may clone the first route topography and create a second route topography that is identical to the first route topography by interacting with the route dashboard 206 user interface screen (e.g. by pushing a "clone" button 820 (see FIG. 8)). The software engine 200 can be configured to interpret the "clone" request as a command to replicate the route identified at step 602.

Once the user 402a clones the first route topography to create a second route topography, the user 402a is prompted at step 606 by the user interface of the route dashboard 206 to give the cloned route topography a different name (i.e. route identifier). After the user has given the second route a route identifier, the user 402a identifies at step 608 route topography information that is to be changed. For example, if a user 402a desires to test a development service in a production environment, the user 402a may select the appropriate service (e.g. NLP service 204c) from the services list at step 610, and change the communication identifier of the selected service to designate a new location of the development service. In other situations, the user 402a may desire to add additional services to the cloned route by assigning unique communication identifiers for each of the additional services.

Figure 7:
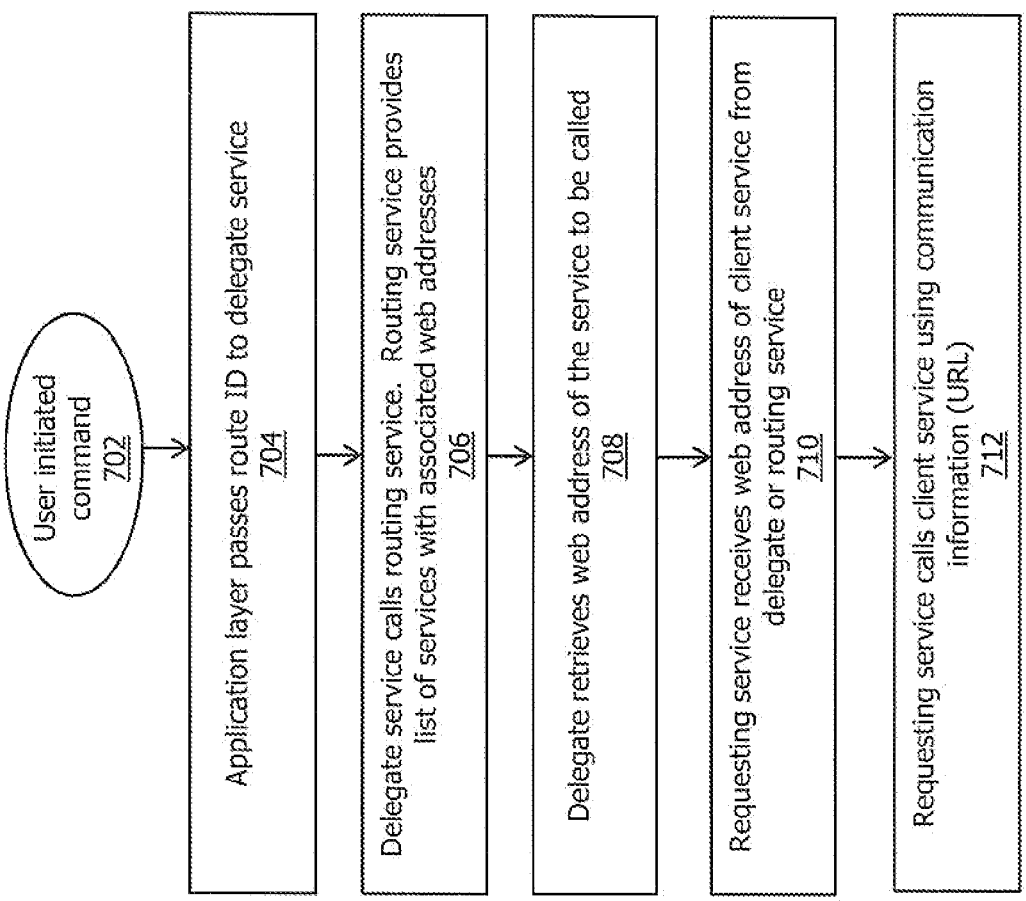
FIG. 7 is a flowchart showing an embodiment of a method for using the routing service.

FIG. 7 illustrates example operations used for a requesting service to access a route topography for the purpose of acquiring one or more communication identifiers of services in a software environment. The process begins with a user initiated command at step 702 that in one embodiment is made from a client application 104 (e.g. by user 402b) resident on an input device 102 to a distributed software engine 200. When the user 402b initiates a command, the client application 104 sends the route identifier of the route topography to the software engine 200 along with the specific request made at step 704. In some embodiments, the request is sent to a gatekeeper service of the software engine 200 such as the delegate service 202 shown in FIG. 2. In other embodiments the request can be sent directly to the routing service 220. In the embodiment shown in FIG. 7, at step 706, the delegate service 202 calls the routing service 220, which provides a list of one or more services along with their associated locations (e.g. web addresses). At step 708, the delegate service 202 retrieves from the routing service 220 the web address of the service to be called. At step 710, the requesting service retrieves the web address of the client service from the delegate service 202 or the routing service 220. The requesting service may further store the route information in its associated route cache 412. At step 712 the requesting service may call the client service using the communication information (URL) associated with the client service that was provided from the routing service 220 and/or the route cache 412.

Reference is next made to FIG. 8 to describe a route dashboard 206 user interface screen viewable with a software application such as a web browser. A developer may use the route dashboard 206 to create and manage route topographies for a variety of software applications 104. The exemplary route dashboard 206 of FIG. 8 may be managed and deployed by a routing service 220 manager. The exemplary route topography of FIG. 8 has a route identifier of "prodv1" which may be set by the developer. The route "prodv1" is associated with a variety of services 204, such as Sync Service, NLP Service, Context Service, Timeline Service, Templatation Service, Platform Services, as well as Delegate Service 202. Each of these services may be added to "prodv1" by a developer or may be cloned (e.g. by using the "clone" button 820) from an existing route topography. Each service (e.g. service 204 or delegate service 202) has an associated communication identifier which is located below the service's title on the exemplary route dashboard 206. A developer may change the communication identifier (i.e. URL or "Host") by clicking on the service (e.g. service 204 or delegate service 202) name. For example, in the exemplary route dashboard 206 the user has clicked on the Platform Service which is shown in text field 810 entitled "Host". The user may click in the text field 810 and change the URL associated with the particular service displayed in text field 810. Once the user is satisfied with the changes, the user may hit the "save changes" button 830. Once the route information has changed and has been saved, the routing service 220 may push the new route topography information to the route cache 412 of each service (e.g. service 204 or delegate service 202). In other embodiments, the routing service 220 saves the new information and provides the route information to one or more services (e.g. service 204 or delegate service 202) upon request.

As shown in FIG. 8, the route dashboard 206 includes a "clone" button 820. A user may create a second route identical to route "prodv1" by pressing the "clone" button 820 and giving the new route a different name such as "prodv2". The user may then add or delete services, change URLs associated with a service 204, and so forth.

The foregoing description has been presented for the purpose of illustration; it is not intended to be exhaustive or to limit the claimed subject matter to the precise forms disclosed. Persons skilled in the relevant art can appreciate that many modifications and variations are possible in light of the above disclosure. As such the embodiments disclosed herein are intended to be illustrative and should not be read to limit the scope of the claimed subject matter set forth in the following claims.

Some portions of this description describe embodiments of the claimed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations or processes described herein may be performed or implemented with one or more hardware or software modules, alone or in combination with other devices. In one embodiment, a software module is implemented with a computer program product comprising computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

What is claimed is:

1. A computer-implemented method of managing route topography information for a software application, the method comprising:
   receiving a development route topography from a route dashboard user interface configured to define and store route topography information, the route dashboard user interface further configured to receive input identifying development software services and associated communication identifiers to define the development route topography, wherein at least one of communication identifies is associated with a development server, the development server separated from a production environment, wherein the route dashboard user interface is configured with a cloning function to generate a replicated production route topography, wherein the replicated production route topography is used to create the development route topography;
   storing the development route topography comprising respective identifiers for each of the development software services for serving the software application and associated communication identifiers providing a location to communicate for the development software services;
   receiving a request for the development route topography; and
   providing the development route topography in response to the request.

2. The method of claim 1, wherein the development route topography is stored in association with a route identifier for identifying the route topography.

3. The method of claim 2, wherein the request is received from at least one of the development software services serving the software application, the at least one of the development software service providing the route identifier as part of the request.

4. The method of claim 3, wherein the development software services for serving the software application provide natural language processing functionality for the software application, the natural language processing functionality comprising deriving a user intent and extracting at least one entity from input received at a client input device.

5. The method of claim 3, wherein the development route topography is retrieved from a data store storing the development route topography using the route identifier.

6. The method of claim 1, wherein the at least one communication identifiers are respective Uniform Resource Locators (URLs).

7. The method of claim 1, wherein the method is performed by a server providing a routing service on behalf of the development software services.

8. A computer-implemented method of providing a service to a software application, the method comprising:
   receiving a request for one or more production services from the software application;
   requesting production route topography information from a routing service, the production route topography information comprising production communication identifiers associated with the one or more production services to provide a location to communicate for the one or more production services, wherein the request for the one or more services from the software application comprises a route identifier to identify the production route topography information and wherein the method comprises using the route identifier when requesting the production route topography information and wherein respective requests for one or more services are received from first and second instances of a same software application, the respective requests having different respective route identifiers associated with different route topography information to thereby to direct communicating with different respective services for responding to the first and second instances of the same software application;
   receiving a development route topography, from a route dashboard user interface, identifying a development service and associated communication identifiers, wherein the development service is configured to substitute a production service selected from the one or more production services; and
   communicating with the development service and the one or more production services using the development route topography in response to the request from the software application.

9. The method of claim 8, comprising caching the route production topography information in a cache.

10. The method of claim 9, comprising looking to the cache for the route topography and requesting route topography information from the routing service only on a cache miss.

11. A computer system comprising at least one processor and a memory storing instructions and data, which when executed by the processor, cause the computer system to perform a method in accordance with claim 1.

12. The computer system of claim 11, wherein the route topography is stored to and retrieved from a data store using a route identifier.

13. The computer system of claim 12, wherein the computer system comprises a server providing a routing service on behalf of the one or more services and wherein the route identifier is received from one of the services to service the software application.

14. The computer system of claim 11, comprising receiving the route topography from a user interface configured to define and store route topography information, the user interface configured to receive input identifying particular software services and associated communication identifiers to define a particular route topography.

15. A computer system comprising at least one processor and a memory storing instructions and data, which when executed by the processor, cause the computer system to perform a method in accordance with claim 8.

16. The computer system of claim 15, comprising caching the route topography information in a cache.

17. A non-transitory computer-readable medium for managing route topography information for a software application, the non-transitory computer-readable medium comprising instructions that, when executed, cause a computer to perform a method in accordance with claim 1.

18. A non-transitory computer-readable medium for managing route topography information for a software application, the non-transitory computer-readable medium comprising instructions that, when executed, cause a computer to perform operations in accordance with claim 8.

* * * * *